United States Patent [19]

Kurokawa

[11] Patent Number: 5,535,151
[45] Date of Patent: Jul. 9, 1996

[54] ELECTRONIC PROCESSOR FOR PERFORMING MULTIPLICATION

[75] Inventor: Masuyoshi Kurokawa, Kanagawa, Japan

[73] Assignee: Sony Corporation, Tokyo, Japan

[21] Appl. No.: 340,854

[22] Filed: Nov. 15, 1994

[30] Foreign Application Priority Data

Nov. 19, 1993 [JP] Japan .................................. 5-314508

[51] Int. Cl.⁶ .................................................. G06F 7/52
[52] U.S. Cl. .................................................. 364/760
[58] Field of Search ................................. 364/760, 759, 364/758, 757

[56] References Cited

U.S. PATENT DOCUMENTS

| | | | |
|---|---|---|---|
| 5,231,415 | 7/1993 | Hagihara | 364/760 |
| 5,235,536 | 8/1993 | Matsuhishi et al. | 364/760 |
| 5,325,320 | 6/1994 | Chiu | 364/760 |
| 5,333,119 | 7/1994 | Raatz | 364/760 |
| 5,426,599 | 6/1995 | Machida | 364/760 |

*Primary Examiner*—David H. Malzahn
*Attorney, Agent, or Firm*—Ronald P. Kananen

[57] ABSTRACT

A processor which can further reduce the number of steps required for the operation of multiplication compared with conventional algorithms. Booth's algorithm is used for a decoding means in a unit signal processing section with a built-in one-bit full adder. This reduces the number of steps required for multiplication compared to conventional algorithms, thereby substantially improving the operating speed of a processor.

9 Claims, 5 Drawing Sheets

| $Y_{2i}$ | $Y_{2i+1}$ | $Y_{2i+2}$ | OPERATION |
|---|---|---|---|
| 0 | 0 | 0 | 0 |
| 0 | 0 | 1 | +X |
| 0 | 1 | 0 | +X |
| 0 | 1 | 1 | +2X |
| 1 | 0 | 0 | −2X |
| 1 | 0 | 1 | −X |
| 1 | 1 | 0 | −X |
| 1 | 1 | 1 | 0 |

FIG. 3

```
MULTIPLICAND X      1 1 0 1 0 0       52

MULTIPLIER  Y  ×) 1 1 0 0 1 0 0       50
                                      PARTIAL PRODUCT
                  1                   (FROM FIG. 3)
          1 0 0 0 1 1 0 0 0           1 0 0 : -2X
            1 1 1 1 0 1 0 0           0 0 1 : +X
        1 0 1 0 0 1 1 0 0             1 1 0 : -X 1 0 1 0 0 0 1 0 1 0 0 0       ( = 2600)
```

| SM | | | 0 | 1 |
|---|---|---|---|---|
| 0 | 0 | | 0 | 1 |
| 0 | 1 | | 1 | 0 |
| 1 | 0 | | 1 | 0 |
| 1 | 1 | | 0 | 1 |

FIG. 8B

| CY | | | 0 | 1 |
|---|---|---|---|---|
| 0 | 0 | | 0 | 0 |
| 0 | 1 | | 0 | 1 |
| 1 | 0 | | 0 | 1 |
| 1 | 1 | | 1 | 1 |

FIG. 7

ELECTRONIC PROCESSOR FOR PERFORMING MULTIPLICATION

BACKGROUND OF THE INVENTION

Field of the Invention

This invention relates to a processor, and more particularly to an improvement of array processors used to perform digital signal processing for image signals.

Conventional array processors of this type for digitally processing image signals include serial video processors (SVP) (see "SVP: Serial Video Processor", IEEE 1990 Custom Integrated Circuits Conference, p17.3.1). These processors have 1,024 one-bit processor elements in a one-dimensional arrangement which constitutes a single instruction multiple data (SIMD) architecture. The SIMD method is a method for executing the same operation on a plurality of computing elements and data by a single instruction in the same flow.

Multiplication is important as a logical operation for processor elements used for digital signal processing. In particular, linear array processors that use one-bit processor elements to process image signals must finish signal processing for a single line within one horizontal feedback time period.

However, currently used one-bit processor elements require many steps for multiplication; a one-bit processor capable of multiplication with fewer steps is desired.

SUMMARY OF THE INVENTION

In view of the foregoing, an object of this invention is to provide a processor capable of executing multiplication with fewer steps than in the prior art.

The foregoing object and other objects of the invention have been achieved by the provision of a processor comprising a plurality of signal processing stages 2 connected in parallel, wherein each of the signal processing stages comprises a shift register 3 for data input; a shift register 4 for data output; memory means 5 used to store and operate data; decoding means for decoding data based on Booth's algorithm; and a unit signal processing section 6 having a built-in one-bit full adder.

Booth's algorithm is used for decoding means in a unit signal processing section with a built-in one-bit full adder. This reduces the number of steps required by the unit signal processing section to perform a multiplication to allow easy implementation of fast processing hardware.

As described above, this invention easily provides a processor capable of executing multiplication with fewer steps than in the prior art by applying Booth's algorithm to decoding means in a unit signal processing section with a built-in one-bit full adder.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Principle

The processor elements in an array processor used in this embodiment are characterized by the inclusion of a decoding circuit and a one-bit full adder that operate in accordance with Booth's algorithm. Booth's algorithm is described briefly by example of a quadratic case.

According to Booth's algorithm, when X and Y that are represented as complements of "2" are expressed as follows:

$$X = \sum_{i=1}^{n-1} (X_i \cdot 2^{n-i}) - X_0 \cdot 2^n \qquad (1)$$

$$Y = \sum_{i=1}^{m-1} (Y_i \cdot 2^{m-i}) - Y_0 \cdot 2^m \qquad (2)$$

if their product Z (=X Y) is expressed as follows:

$$Z = \sum_{i=1}^{(m-1)/2} (Y_{2i+2} + Y_{2i+1} - 2 \cdot Y_{2i}) \cdot X \cdot 2^{m-2i-l} \qquad (3)$$

the number of additions for the multiplicand (partial product) can be reduced by half. In these equations, "m" is an odd number.

That is, while other methods require the addition of "m−1" times with shifting the multiplicand by one bit at a time for the number of the bits of the multiplier, Booth's algorithm only requires half the number of additions, as can be seen from the maximum value of the suffix "i" of Σ being (m−1)/2.

The flow of processing when this algorithm is implemented in commonly used parallel hardware is described in an example using the flow of multiplication with a 6-bit multiplier and a 6-bit multiplicand. This multiplication usually requires the addition of six partial products. With this algorithm, however, the maximum of the suffix "i" of Σ in Equation (3) is "2". This indicates that multiplication with this algorithm requires the sum of three partial products for a suffix "i" of "0", "1", or "2" ("SSSSSSOOOOOO", "SSSSOOOOOO", and "SSOOOOOO"). This is shown in FIG. 1 where "S" in the partial product is a sign bit representing plus or minus.

Figure 2:
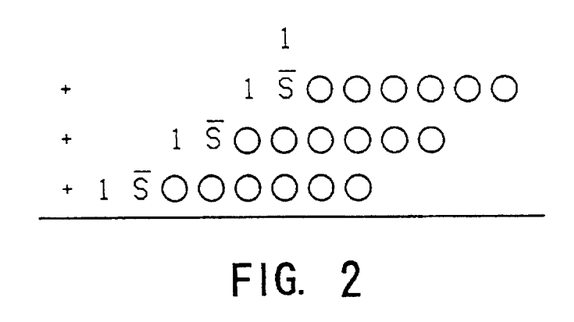

In this case, however, higher order bits require many sign bits S. FIG. 2 then shows another operation in which the part the sign bit S must be expanded when addition is executed is simplified. In this FIG. 2, "1" is placed above an inversion of sign bit S and before each sign bit S to omit the operation of the sign bit S to be expanded as a higher order bit. This results in a single sign bit for each product. Although this simplification increases the number of required additions by one, this number is still smaller than that of conventional methods.

Figure 1:
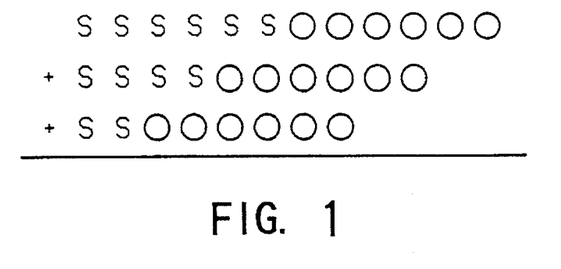
FIGS. 1 and 2 are charts explaining the algorithm used by a processor according to this invention.
Figure 3:
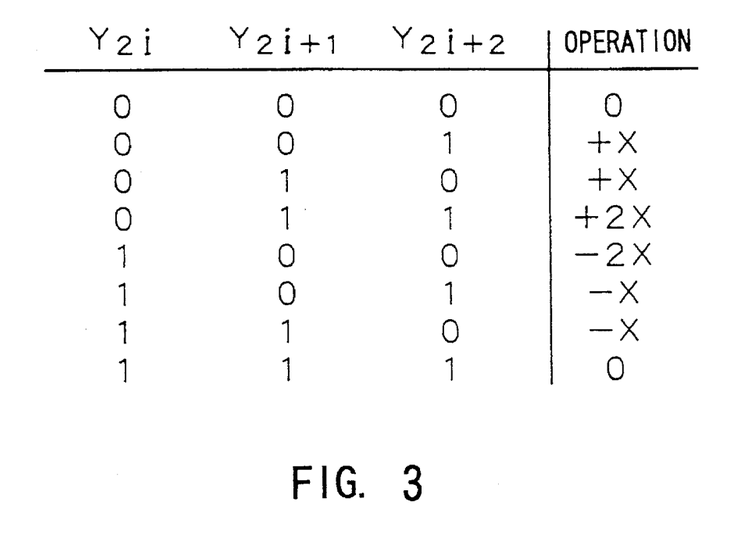
FIG. 3 is a translation table showing the results of operations corresponding to the respective partial products.

Each product in FIGS. 1 and 2 is expressed as "SOOOOOO," but, in fact, a value is added to each sign based on the values in the translation table in FIG. 3. This translation table lists the results of operations between a combination of three adjacent bits of a multiplier Y ($Y_{2i}$, $Y_{2i+1}$, $Y_{2i+2}$) and the corresponding multiplicand X.

If, for example, the multiplicand is referred to as X, the value of the partial product is "0000000" when the result of an operation is "0". However, when the result of an operation is "+X", the value of the partial product is represented by seven bits code-expanded by the sign bit S. Furthermore, when the result of an operation is "−X", the value of the partial product is represented by the seven bits, each of which has been inverted and incremented by "1". When the result is "+2X", the value of the partial product is represented by the multiplicand X shifted to the left by one bit with the least significant bit (LSB) is changed to "0". However, when the result is "−2X", the value of the partial product is represented by the multiplicand X shifted to the left by one bit with the least significant bit changed to "0", and then subjected to a bit inversion and an incrementation of "1".

Figure 4:
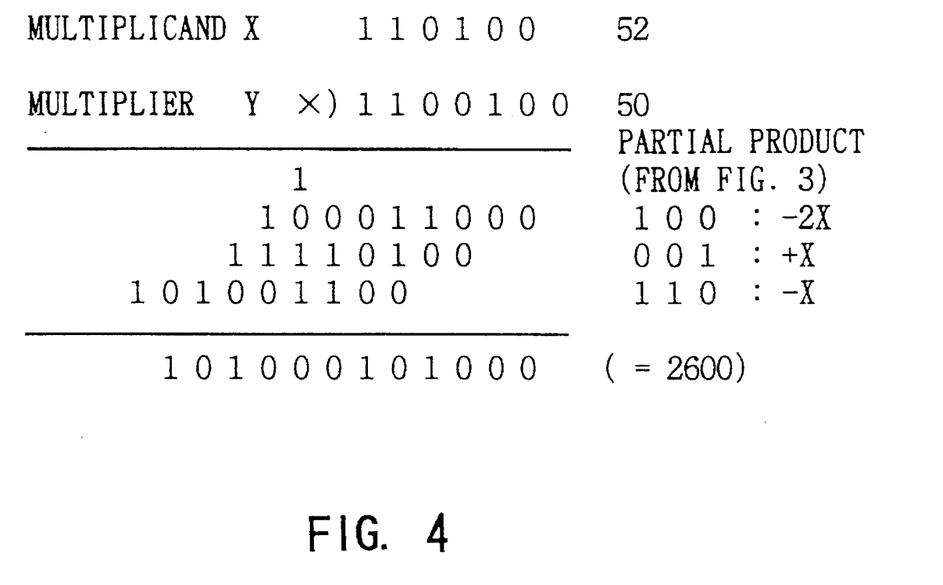
FIG. 4 is a chart showing the calculation of 52×50=2600 (101000101000) by using Booth's algorithm.

For example, 52×50=2600 (101000101000) is calculated by using Booth's algorithm as shown in FIG. 4.

(2) Overall configuration

Figure 5:
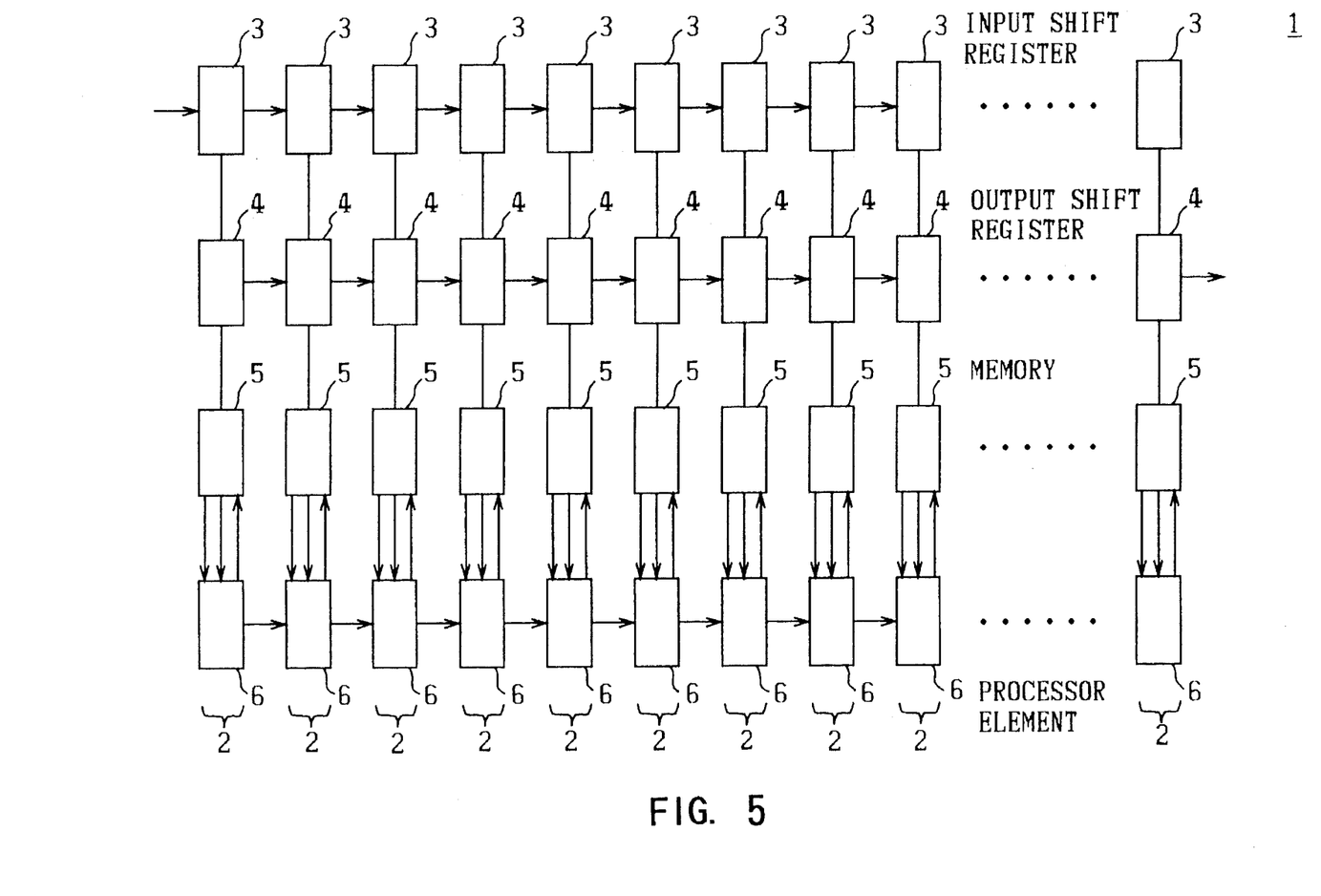
FIG. 5 is a block diagram illustrating the overall configuration of the processor.

The configuration of hardware in which Booth's algorithm is applied to a one-bit full adder is described with reference to FIG. 5.

In this figure, an array processor block for processing image signals is generally shown at 1. This processor block 1 comprises as many subblocks 2 placed horizontally as pixels in a single scanning line. Each subblock 2 comprises input and output shift registers 3 and 4, a memory 5, and a processor element 6, all connected vertically with bit lines.

While data for a single line is fed to the input shift register 3, data for a single line is output from the output shift register 4.

During image blanking, each processor element 6 reads data from the input shift register 3, and writes the result of signal processing to the output shift register 4.

The space of this processor is limited because as many processor elements 6 as pixels for a single line for a single chip constituting a LSI (for example, 740, 1,024, or 2,200) must be placed horizontally therein. The processor element 6 thus reads data to a one-bit full adder by one or two bits at a time, and processes the data while it is stored in memory. In this case, addition requires as many processing steps as given bits. In addition, multiplication requires as many processing steps as the bits multiplied by the number of the bits of the multiplicand.

(3) Configuration of subblocks

Figure 6:
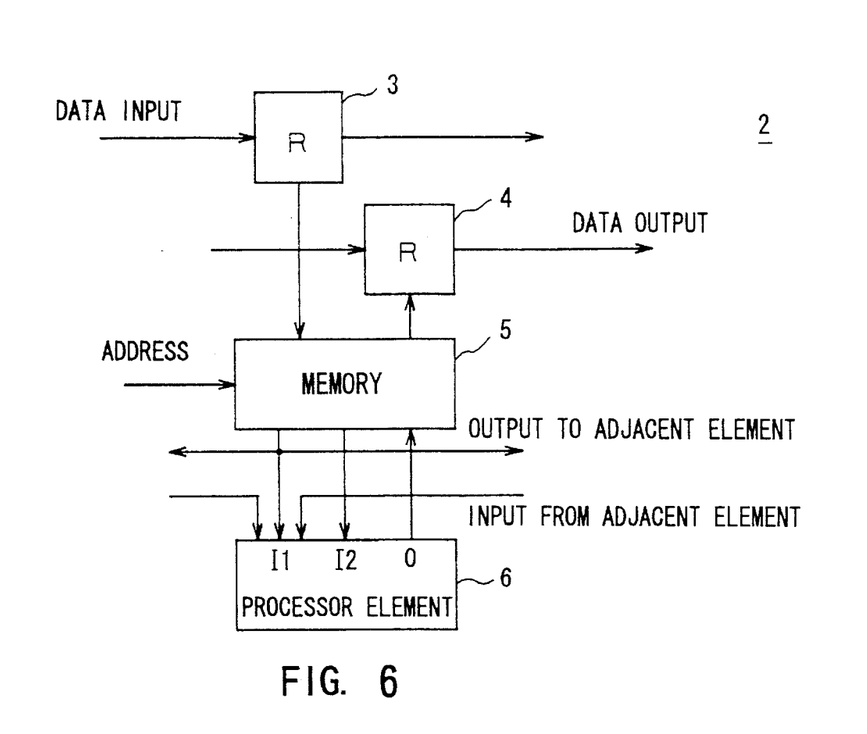
FIG. 6 is a block diagram illustrating a subblock.

Each subblock 2 has a configuration shown in FIG. 6. Each processor element 6 is provided with memory means such as memory 5. The processor element 6 stores various data in memory 5, and also reads data therefrom, processes it according to a signal, and writes the result back to memory 5. The I/O shift registers 3 and 4 are located to share the same address space as memory 5.

A process that allows both memory and logic elements to reside on the same chip is used to manufacture such a system. This avoids problems involved in communication between memory and logic elements, and allows image and other signals comprising many pieces of data to be processed simultaneously.

In the commonly used system in which memory is separated from a processor (processor element), communication between them may be a problem.

Memory 5 and each processor element 6 that are selected by an address supplied externally are connected via an I/O port.

Each memory I/O comprises three ports using the two-read and one-write method. This is because the full adder in the processor element 6 and various logical operations use two inputs and one output as a basic configuration.

The I/O of the full adder actually has three inputs and two outputs. Nevertheless, the two-input and one-output is a basic configuration because one input and one output are often saved in the processor element as the result of a carry. Accordingly, in the embodiment of this invention, the processor element and memory are connected with two inputs I1, I2 and an output O.

(4) Configuration of processor elements

Figure 7:
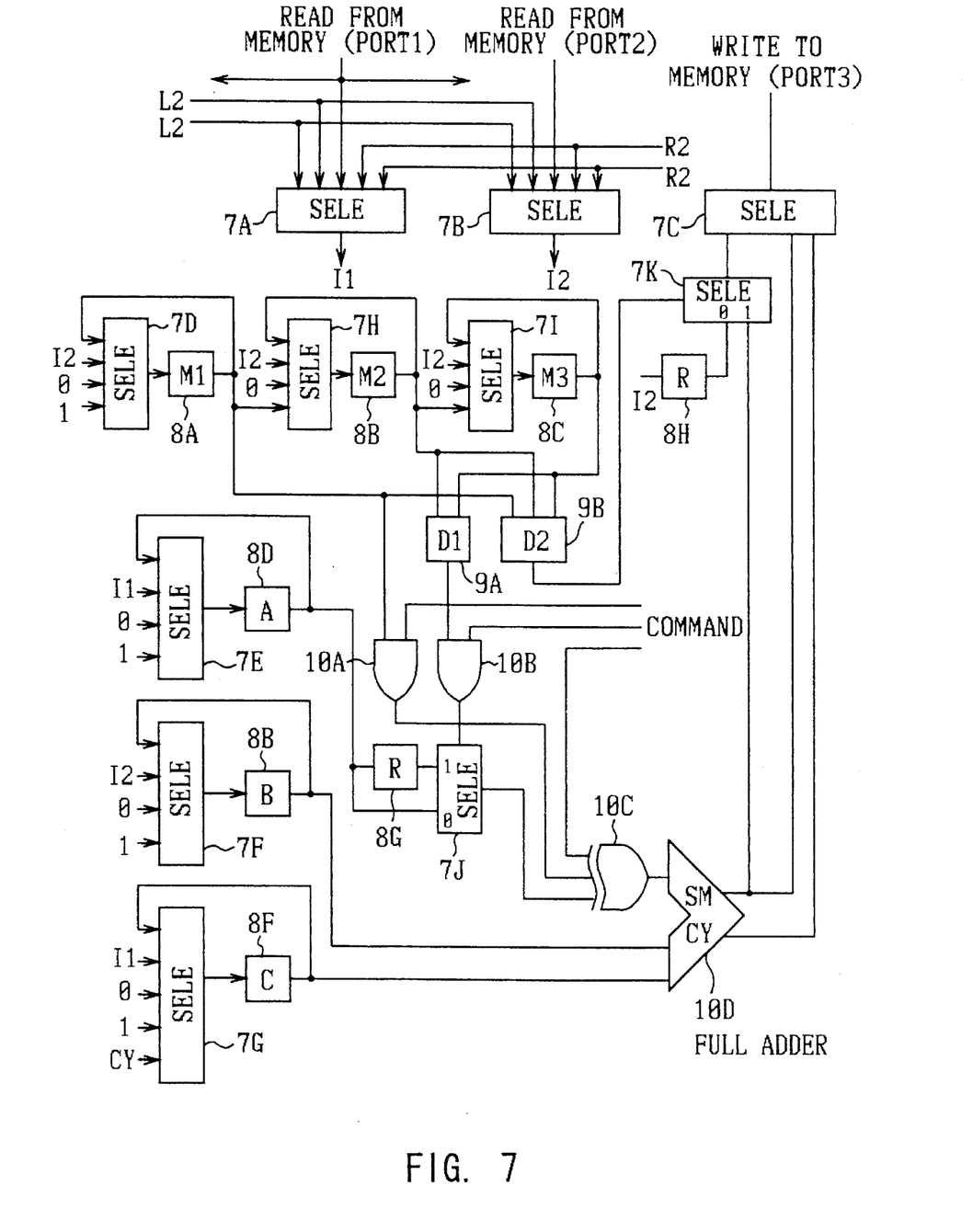
FIG. 7 is a block diagram illustrating a processor element.
Figure 8A:
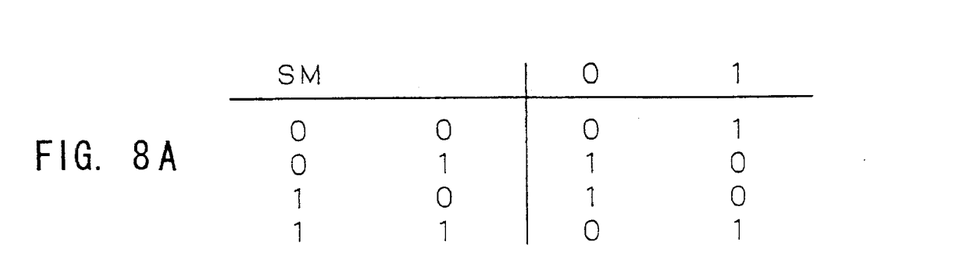
FIGS. 8A and 8B are charts showing the output of a full adder.
Figure 8B:
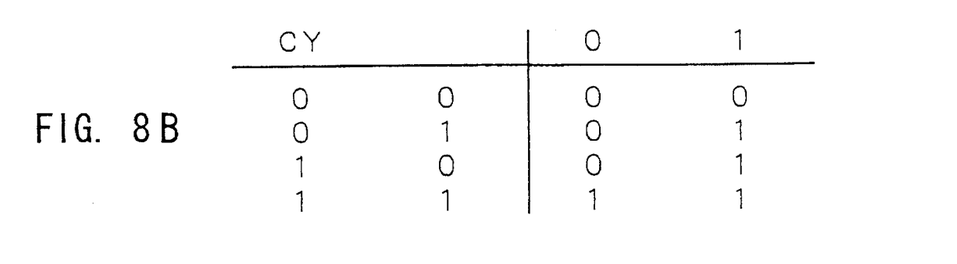

The configuration of the processor element 6 is described with reference to FIG. 7. A selector may be provided immediately preceding the three I/O ports to allow the values in the memories of adjacent processors to be read. The processor according to this embodiment can receive the output from four horizontally adjacent processor elements.

In addition, the selector preceding the output can select from a sum (SM), a carry (CY), and the output of selector 7K controlled by a control register (registers M1, M2, and M3) in the processor element. Inputting to the output selector the output of selector 7K controlled by the control register enables conditional selection (conditional branching).

Since such a processor with a single instruction multiple data (SIMD) architecture does not allow software to conditionally select data for each processor, hardware must be used instead.

The conditional selection of data is described as follows: Two pieces of data are stored in different locations in memory, and each processor element individually selects one of the data items according to the logical value of a control bit differing from the preceding data.

The control bit is first read to the register M1, and held therein. At this point, "0" is loaded into registers M2 and M3.

One of the data items is read via the input I1 while the other data item is read via the input I2. Data is written to a work area. A full adder 10D is then controlled to cause the value of the input signal I1 to be directly output from the output end SM, and output selector 7C selects the signal selected by register M1 and output by selector 7K.

The selected data has been written to the work area according to the logical value of the control bit. This ability to conditionally select data enables conditional branching in which processing is changed according to conditions.

Thus, after all possible processing has been executed, an appropriate result may be selected according to conditions for each processor as the result of processing including conditional branching.

A controllable one-clock delay is provided for the input from register A to the full adder 10D. Whether or not the one-clock delay is inserted can be selected according to an externally supplied control signal or the logical value of a bit delivered to the control register. In this case, when data is read for manipulation starting from the least significant bit (LSB), data is shifted toward the most significant bit (MSB) by one bit.

Decoder D1 serves to operate the one-clock delay when the values of both registers M2 and M3 are "0" or "1".

The core of the processor element 6 is the full adder 10D. An inverter (exclusive OR (EOR)) is provided for the input from register A to invert values supplied to the full adder 10D according to an external control signal or the value of the control register.

When the value of the register M1 is "1", this bit is inverted. This bit inversion corresponds to subtraction in FIG. 3. In subtraction, "1" must thus be added to the LSB in addition to the bit inversion. Register C is thus loaded with "1" during the step in which the LSB is calculated. The value of the other input I2 is provided for the input of register B.

The input of register C is mainly used for carrying, the output CY of the full adder 10D is supplied to this input.

The use of the control register is described as follows: The inversion of the output signals from register A is controlled by the value loaded into register M1, as described above. Decoder D1 causes the one-clock delay R to be inserted into line A when the hold values of both registers M2 and M3 are "0" or "1". Register 8G is inserted to realize 2X.

Decoder D2 causes selector 7K to be controlled and input I2 to be selected when the both values of registers M1, M2, and M3 are "0" or "1".

If, for example, "0" is loaded into register M3 and a specific bit of memory is read into register M2, the bit can be used to control the use of the one-clock delay register.

In multiplication with a constant coefficient, registers M are controlled from command lines and used to perform cumulative additions based on Booth's algorithm. A method for using registers M1, M2, and M3 to perform decoding of Booth's algorithm in order to quickly execute multiplication with a non-constant is described below.

A multiplier is read from input I2 by two bits from the least significant bit (LSB) at a time, and the respective two bits are held in registers M1, M2, and M3. Register M3 initially has a value of "0". The value of register M1 controls the inversion of the input from register A to full adder 10D. When the values of both registers M2 and M3 are "0" or "1", register R 8G that provides input to register A is selected as the target to which full adder 10D delivers input (decoder D1) to allow the input X to be doubled. When the values of registers M1, M2 and M3 are "0" or "1", selector, 7K, preceding the output selector, selects a direct input from memory (decoder D2) to implement a function similar to Booth's decoding described above.

An external command can mask decoder D1 using 10B. In addition, an external command can forcibly invalidate signals from register M1 using 10A. Once addition for the first stage of the partial product is finished, multiplication and the next two higher order bits are read to register M1 and shifted to register M2 and then to register M3. In this manner, the values of these three registers are used to perform addition and subtraction for partial products. The same instruction enables each processor element to perform different multiplication using a different multiplier and Booth's algorithm. Selectors without control input are controlled by external commands.

(5) Multiplication

The procedure of operations using an array processor with the above configuration is described as follows:

Multipliers (Y0 to Y5) and multiplicands (X0 to X5) are stored in a specific region of memory, and there is a work area (W0 to W11) having as many bits as the sum of the bits of the multipliers (Y0 to Y5) and the multiplicands (X0 to X5). The result is stored in this work area at last. Moreover, work memories Tφ and T1 are used. The processor can read one bit at a time from two ports. In addition, the work area has been cleared.

Functions to be performed for each step are described as follows:

Processing by the processor element is based on the algorithm shown in FIG. 2. The processor element invalidates an addition in its output section when the partial product is "0". However, since it thus requires an inversion of sign bit S, it must selectively determine the value of this bit and write it to the work memory (unused part of memory) in advance. Before partial products are added, the registers must be cleared for the one-clock delay that allows processing to be doubled.

In step 1, the processor element 6 loads register M1 with the value of the multiplier (Y5), and simultaneously loads register M2 with "0".

In step 2, the processor loads register M1 with the multiplier (Y4), and simultaneously shifts the value of register M1 to register M2 and shifts the value of register M2 to register M3.

In subsequent step 3, the processor reads "1" from input I2 to selector 7K, and simultaneously takes from the output SM of full adder 10D the logical value of multiplicand X0 that has been submitted to register M1 and then inverts and reads it to selector 7K. The processor then outputs the output selected according to decoder D2, and writes it to work memory Tφ.

In step 4, the input selector of register B selects "1", the input selector of register A selects "0", and the processor lets register 8G on line A pass through data, and writes the output CY of full adder 10D to register C. If the result of the operation is negative, "1" is input to register A, and "1" is written into register C. At the same time, register 8G is loaded with "0".

In step 5, multiplicand X5 is input to register A, W11 is input to register B, and output SM or W11 is written to work area W11.

In step 6, multiplicand X4 is input to register A, W10 is input to register B, and output SM or W10 is written to work area W10.

In step 7, multiplicand X3 is input to register A, W9 is input to register B, and output SM or W9 is written to work area W9.

In step 8, multiplicand X2 is input to register A, W8 is input to register B, and output SM or W8 is written to work area W8.

In step 9, multiplicand X1 is input to register A, W7 is input to register B, and output SM or W7 is written to work area W7.

In step 10, multiplicand X0 is input to register A, W6 is input to register B, and output SM or W6 is written to work area W6.

In step 11, work memory Tφ is input to register A, "1" is input to register B, and output SM is written to work area W5.

In step 12, "1" is input to register A, "0" is input to register B, and output SM is written to work area W4.

In step 13, "0" is input to register A, "0" is input to register B, and output SM is written to work area W3 (output CY in the previous step).

Then, in step 14, register M1 is loaded with multiplier Y3. Register M2 shifts the value of register M1, and register M3 shifts the value of register M2.

In step 15, register M1 is loaded with multiplier Y2. Register M2 shifts the value of register M1, and register M3 shifts the value of register M2.

Then, in step 16, the processor reads "1" from input I2, outputs from output SM the logical value of multiplicand X0 that has been submitted to register M1 and then inverted, makes a selection according to decoder D2, and writes the selected data to work memory T*.

In step 17, the input selector of register B selects "1", the input selector of register A selects "0", the processor lets register 8G on line A pass through data, and writes output CY to register C. If the result of the operation is negative, "1" is input to register A and "1" is written to register C. At the same time, register 8G is loaded with "0".

In step 18, multiplicand X5 is input to register A, W9 is input to register B, and output SM or W9 is written to work area W9.

In step 19, multiplicand X4 is input to register A, W8 is input to register B, and output SM or W8 is written to work area W8.

In step 20, multiplicand X3 is input to register A, W7 is input to register B, and output SM or W7 is written to work area W7.

In step 21, multiplicand X2 is input to register A, W6 is input to register B, and output SM or W6 is written to work area W6.

In step 22, multiplicand X1 is input to register A, W5 is input to register B, and output SM or W5 is written to work area W5.

In step 23, multiplicand X0 is input to register A, W4 is input to register B, and output SM or W4 is written to work area W4.

In step 24, "0" is input to register A, "0" is input to register B, the values of decoder D1 and register M1 are masked using AND gates 10A, 10B, and the carry from register C is output to SM, while "0" is read from I2 to selector 7K, and the output of selector K is written to work memory T1.

In step 25, the value of work memory T1 is read to register C.

In step 26, work memory Tϕ is input to register A, W3 is input to register B, and output SM is written to work area W3.

In step 27, "1" is input to register A, "0" is input to register B, and output SM is written to work area W2.

In step 28, "0" is input to register A, "0" is input to register B, and output SM is written to work area W1 (output CY in the previous step).

Then, in step 29, register M1 is loaded with multiplier Y1. Register M2 shifts the value of register M1, and register M3 shifts the value of register M2.

In step 30, register M1 is loaded with multiplier Y0. Register M2 shifts the value of register M1, and register M3 shifts the value of register M2.

In step 31, the processor reads "1" from input I2, outputs from output SM the logical value of multiplicand X0 that has been submitted to register M1 and then inverted, makes a selection according to decoder D2, and writes the selected data to work memory Tϕ.

In step 32, the input selector of register B 8G selects "1", the input selector of register A selects "0", the processor lets register 8G on line A pass through data, and writes output CY to register C (If the result of the operation is negative, "1" is input to register A and "1" is written to register C. At the same time, register 8G is loaded with "0").

In step 33, multiplicand X5 is input to register A, W7 is input to register B, and output SM or W7 is written to work area W7.

In step 34, multiplicand X4 is input to register A, W6 is input to the register B, and output SM or W6 is written to work area W6.

In step 35, multiplicand X3 is input to register A, W5 is input to register B, and output SM or W5 is written to work area W5.

In step 36, multiplicand X2 is input to register A, W4 is input to register B, and output SM or W4 is written to work area W4.

In step 37, multiplicand X1 is input to register A, W3 is input to register B, and output SM or W3 is written to work area W3.

In step 38, multiplicand X0 is input to register A, W2 is input to register B, and output SM or W2 is written to work area W2.

In step 39, "0" is input to register A, "0" is input to register B, the values of decoder D1 and register M1 are masked using the AND gates 10A, 10B, and the carry from register C is output to SM, while "0" is read from I2 to selector 7K, and the output of selector K is written to work memory T1.

In step 40, the value of work memory T1 is read into register C.

In step 41, work memory Tϕ is input to register A, "1" is input to register B, and output SM is written to work area W1.

Finally, in step 42, "1" is input to register A, "0" is input to register B, and output SM is written to work area W0.

The 42 steps described above generate a product in each of work areas W0 to W11. This is due to some overhead other than additions.

In this embodiment, since multiplication with the commonly used method with straight binary requires 48 steps as described above (since each partial product involves the reading of one bit of a multiplier and as many additions as the bits of a multiplicand, $(2+6) \times 6 = 48$), multiplication with the complement of "2" can be executed with fewer steps.

With the above configuration in which processor elements constituting an array processor comprise a decoder circuit and a one-bit full adder 10D that use Booth's algorithm, and a plurality of selectors control the circuit and adder, multiplication can be executed with fewer steps than with conventional processor elements.

In the above embodiment, both the multiplier and the multiplicand are six bits long. However, this invention is not limited to this aspect, and the number of bits of the multiplier or multiplicand may be more or fewer than six bits.

The difference between the number of steps required by the algorithm of the embodiment and that required by conventional algorithms increases with the number of bits of the multiplier or multiplicand; in this case, operations using the algorithm of the embodiment are much more advantageous than those using conventional algorithms.

In addition, in the above embodiment, the processor operates in accordance with the algorithm shown in FIG. 2. However, this invention is not limited to this aspect, and the processor unit 6 can be configured to operate in accordance with the algorithm shown in FIG. 1.

Furthermore, in the above embodiment, the processor processes image signals. However, this invention is not limited to this aspect, but is widely applicable to signal processing that requires fast multiplication.

This description is made in connection with the preferred embodiments of the invention. It will be obvious to those skilled in the art that various changes and modifications may be made to cover in the appended claims all such changes and modifications as fall within the true spirit and scope of the invention.

What is claimed is:

1. A processor which is composed of a plurality of signal processing stages, performing multiplication with multiplicand and multiplier, connected in parallel, wherein each of said signal processing stages comprising:

a shift register for data input;

a shift register for data output;

memory means for storing said input data and a calculated result in a multiplication process; and partial product calculating means for performing a predetermined calculation on said multiplicand in accordance with a combination of neighboring three bits of said multiplier so as to obtain a partial product, and for storing the partial product in a predetermined area of said memory means;

wherein said partial product calculating means include a one-bit full adder for adding a plurality of partial products obtained by said partial product calculating means.

2. The processor according to claim 1, wherein said partial product calculating means further comprises:

first, second, and third registers for respectively storing three bits of said multiplier as control data;

first decoding means for judging whether or not a combination of said three bits requires double said multiplicand;

a shift register for shifting one bit of said multiplicand when said first decoding means judges that the double calculation is required;

second decoding means for judging whether or not a combination of said three bits requires subtraction; and means for inverting a bit of said multiplicand and for adding "1" to LSB (Least Significant Bit) when said second decoding means judged that the subtraction is required.

3. The processor according to claim 2, wherein; said first decoding means judges that said double calculation is required when both values of said second and third registers are "0" or "1".

4. The processor according to claim 2, wherein; said second decoding means judges that said subtraction is required when both values of said first and second registers are "0" or "1".

5. The processor according to claim 2, wherein; said partial product calculating means further comprises means for adding "1" and the inverted value of the sign bit representing plus or minus to the MSB (Most Significant Bit) side of the multiplicand, at the final stage of calculation for obtaining said partial product.

6. The processor according to claim 2, wherein;

said one-bit full adder adds a plurality of partial products obtained by said partial product calculating means by one bit, and outputs a sum and a carry as the added result.

7. The processor according to claim 6, further comprising;

a fourth register for storing said carry, wherein said one-bit full adder adds the carry value from said fourth register.

8. The processor according to claim 2, wherein; said signal processing stages correspond in number to the number of pixels of one scanning line in an image signal and are connected in parallel.

9. A processor which is composed of a plurality of signal processing stages, performing multiplication with multiplicand and multiplier, connected in parallel, wherein each of said signal processing stages comprising:

a shift register for data input;

a shift register for data output;

memory means for storing said input data and a calculated result in a multiplication process; and partial product calculating means for performing a predetermined calculation on said multiplicand in accordance with a combination of neighboring three bits of said multiplier so as to obtain a partial product, and for storing the partial product in a predetermined area of said memory means.

* * * * *